United States Patent
Herring, Jr. et al.

(10) Patent No.: US 11,080,073 B2
(45) Date of Patent: Aug. 3, 2021

(54) COMPUTERIZED TASK GUIDANCE ACROSS DEVICES AND APPLICATIONS

(71) Applicant: MICROSOFT TECHNOLOGY LICENSING, LLC, Redmond, WA (US)

(72) Inventors: Russell Allen Herring, Jr., Sammamish, WA (US); Adam Fourney, Redmond, WA (US); Ryen William White, Woodinville, WA (US); Paul Nathan Bennett, Redmond, WA (US)

(*) Notice: Subject to any disclaimer, the term of this patent is extended or adjusted under 35 U.S.C. 154(b) by 0 days.

(21) Appl. No.: 16/925,816

(22) Filed: Jul. 10, 2020

(65) Prior Publication Data

US 2021/0064398 A1 Mar. 4, 2021

Related U.S. Application Data

(63) Continuation of application No. 15/926,857, filed on Mar. 20, 2018, now Pat. No. 10,747,560.

(51) Int. Cl.
| | |
|---|---|
| *G06F 3/048* | (2013.01) |
| *G06F 9/451* | (2018.01) |
| *G06F 3/0482* | (2013.01) |
| *G06F 40/103* | (2020.01) |
| *G06F 40/169* | (2020.01) |

(52) U.S. Cl.
CPC ............ *G06F 9/453* (2018.02); *G06F 3/0482* (2013.01); *G06F 40/103* (2020.01); *G06F 40/169* (2020.01)

(58) Field of Classification Search
None
See application file for complete search history.

(56) References Cited

U.S. PATENT DOCUMENTS

| | | | |
|---|---|---|---|
| 2017/0068854 A1* | 3/2017 | Markiewicz | ........ G06F 3/04883 |
| 2018/0005631 A1* | 1/2018 | Lee | ......................... G06F 3/167 |

* cited by examiner

*Primary Examiner* — Claudia Dragoescu
(74) *Attorney, Agent, or Firm* — Shook, Hardy & Bacon, LLP

(57) ABSTRACT

A digital task document can include instructions for performing a task, and a task state data structure can indicate a state of completion of the task. A first update of the data structure can be performed in response to visual user input received from a user profile via a first computer application/device. A second update of the data structure can be performed in response to natural language input received from the user profile via the second computer application/device. A first set of task guidance can be provided to the user profile via the first application/device in a visual format by displaying the task document on a computer display. A second set of task guidance can be provided to the user profile via the second application/device in a natural language format. The first and second sets of task guidance can be provided using the task document and the data structure.

20 Claims, 10 Drawing Sheets

SOFTWARE 180 IMPLEMENTING COMPUTERIZED
TASK GUIDANCE ACROSS DEVICES AND
APPLICATIONS

COMPUTERIZED TASK GUIDANCE ACROSS DEVICES AND APPLICATIONS

CROSS-REFERENCE TO RELATED APPLICATIONS

This application is a continuation of U.S. application Ser. No. 15/926,857, filed Mar. 20, 2018, entitled "Computerized Task Guidance Across Devices and Applications," all of which is hereby expressly incorporated by reference in its entirety.

BACKGROUND

Computing devices are often used for guidance in following step-by-step instructions. For example, people routinely bring smartphones, tablets, or laptops into their kitchens, workshops, or workspaces so that they can follow step-by-step instructions that are loaded from the web via a web browser. To allow a user's hands to be free to perform the task, some such instructions have been provided using audible instructions from computing devices, such as an intelligent speaker device, which is a computing device that provides an audio-based user interface through which interaction with a digital assistant can occur. The audio-based user interface of the intelligent speaker device can include at least one speaker and one or more microphones, such as a far-field microphone or far-field microphone array. Such an intelligent speaker device may include one or more other user interface devices, such as one or more computer displays, but intelligent speaker devices often do not include displays. A digital assistant is a computer component that is configured to process natural language input and to respond with natural language dialog scripts to conduct a conversational natural language dialog, as is discussed more below.

SUMMARY

Tools and techniques discussed herein can deal with technical problems with providing computerized task guidance, such as the problems discussed below in the Detailed Description section. The tools and techniques can include providing computerized task guidance across different applications and/or devices that utilize different user interface interaction modalities. For example, at least one such device or application can provide visual or display-based interaction and the other can provide natural language dialog interaction, but with both using a shared digital task document and digital task state data structure to maintain state and provide a consistent experience across such different interaction modalities. This can improve the computer system, making it more useable and efficient, and overcoming technical problems with prior systems.

In one aspect, the tools and techniques can include accessing a digital base task document that is configured to be displayed on a computer display, with the base task document including textual task instructions for completing a task. A digital working task document can be generated from the base task document. The working task document can include textual task instructions, and it can include format changes relative to the base task document. The format changes can include a set of one or more changes that format the working task document for use in conducting a natural language dialog including natural language user input from a user profile and responsive natural language scripts from a digital assistant operating in a computer system that can perform the technique. At least a portion of the working task document can be displayed on a computer display via a first computing device. The displaying of the working task document and the natural language dialog can both provide the user profile with guidance for performing the task based on the working task document. Additionally, a natural language script can be presented via a second computing device that is separate from the first computing device, using information from at least a portion of the working task document. Each of the first and second computing devices can be configured to present textual data based on the working task document as user output without requiring involvement of the other computing device (though one of the computing devices may receive updated data in response to an update prompted by the other computing device).

A computer-readable task state data structure that represents a state of interaction with the working task document can be generated. The task state data structure can be accessible via the first computing device and via the second computing device. Also, each of the first computing device and the second computing device can be configured to retrieve data from the task state data structure and to update the task state data structure without requiring involvement of the other computing device (though one of the computing devices may receive updated data in response to the other computing device updating the task state data structure). In response to receiving a natural language user input command via the second computing device as part of the natural language dialog, a natural language response that is particular to one or both of the task state data structure and the working task document can be generated. The generating of the natural language response can also use one or both of the task state data structure and the working task document. The natural language response can be presented via the second computing device and may also be presented via the first computing device.

In another aspect of the tools and techniques, a digital working task document, which includes a textual task description describing task steps to be completed in performing a task, can be accessed via a first computing device. At least a portion of the working task document can be displayed on a display via the first computing device. Also, at least a portion of the working task document can be accessed via a second computing device that is separate from the first computing device. Moreover, a computer-readable task state data structure that represents a state of interaction with the working task document can be generated, with the task state data structure being accessible via the first computing device and the second computing device. A natural language dialog script can be presented, with the dialog script representing at least a portion of the working task document via a second computing device. In response to receiving visual user input via the first computing device, an update to the task state data structure can be performed to represent the visual user input. The visual user input can be directed at an item on the working task document on the display, and the visual user input can indicate a state of progress in completing the task (such as input indicating a task step is to be marked complete). In response to receiving a natural language user input command via the second computing device, a natural language response that is particular to the task state data structure can be generated. The generating of the natural language response can include accessing the task state data structure, and with the natural language response providing guidance for performing the task and representing the update to the task state data structure. The natural language response can be presented via the second computing device and may also be presented via the first computing device.

In yet another aspect of the tools and techniques, an interactive computer communication session with an authenticated user profile can be conducted via a first computer application, a second computer application, a shared digital working task document, and a shared digital task state data structure. The working task document can include instructions for performing a task, with the task state data structure indicating a state of completion of the task. The conducting of the session can include performing a first update of the task state data structure in response to visual user input received from the user profile via the first computer application, with the visual user input directed at an element of the working task document. The conducting may also include performing a second update of the task state data structure in response to natural language input received from the user profile via the second computer application. The conducting may further include providing a first set of task guidance to the user profile via the first computer application in a visual format by displaying at least a portion of the working task document on a computer display, with the first set of task guidance being provided using the working task document and the task state data structure, and with the first set of task guidance representing the first update and the second update. The conducting may also include providing a second set of task guidance to the user profile via the second computer application in a natural language dialog format, with the second set of task guidance being provided using the working task document and the task state data structure.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
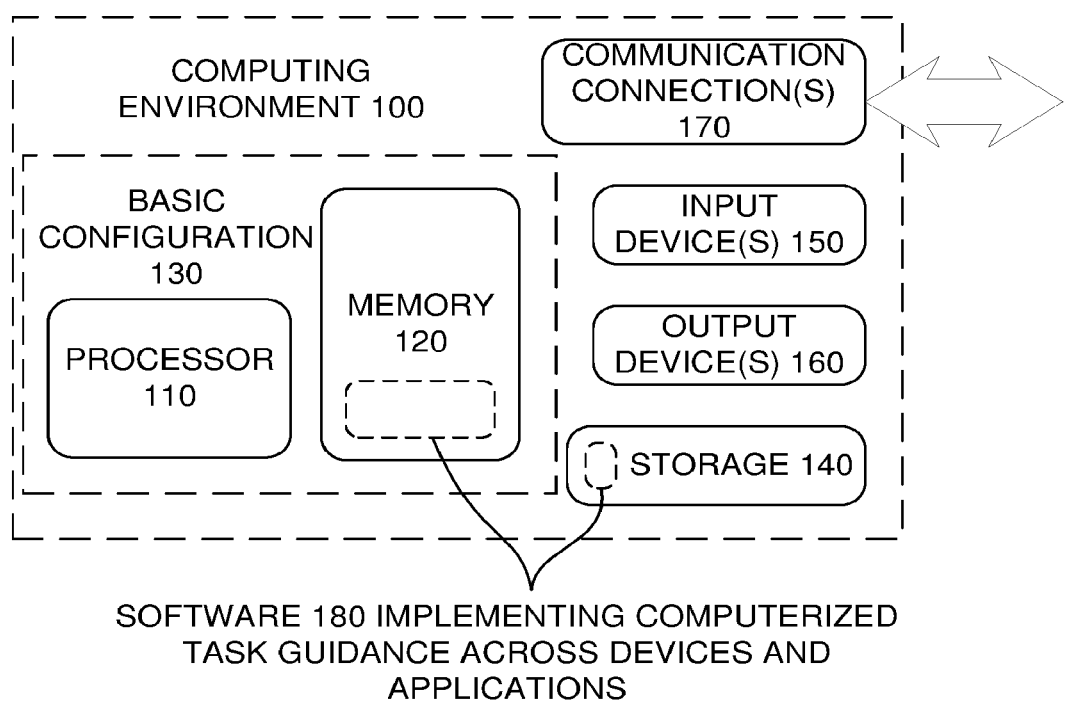
FIG. 1 is a block diagram of a suitable computing environment in which one or more of the described aspects may be implemented.

Aspects described herein are directed to techniques and tools for improved computerized guidance for task completion, such as improved usability and efficiency of the computer system in providing computerized guidance for task completion. Such improvements may result from the use of various techniques and tools separately or in combination.

It has been found that using display-based computing devices to provide guidance on performing a task through a computer display is problematic because such devices typically require a user to view the display, and often require a user's hands to provide input. This can be inefficient for a user who is performing a task that uses the hands, requires the hands to get dirty or be gloved for at least part of the task, and/or that requires movement away from the device, such as when the task is cooking a recipe or assembling a mechanical device, for example. Using computer applications that provide audible guidance for task completion, such as intelligent speaker devices with a natural language digital assistant, has its own technical problems. For example, it is challenging for such a digital assistant to skip around in instructions, as can be useful in providing guidance for performing a task. Other challenges with such audio systems can include communicating system state, communicating complex concepts, and communicating long sequences of steps.

The inventors have discovered that one or more such technical problems can be handled by providing computerized task guidance across two or more different applications and/or devices, where at least one such device or application can provide visual or display-based interaction and another can provide natural language dialog interaction, but with both using a shared digital task document and digital task state data structure to maintain state and provide a more seamless experience with such different modalities.

In some implementations, the techniques and tools discussed herein may include tightly coupling a mobile device (smartphone, tablet, or other device with a screen) with an intelligent speaker device such that they each provide device-appropriate access to the instructions contained in a common working document (e.g., instructions that are displayed in the smartphone's browser). The browser and intelligent speaker device can then share information in real-time, allowing users to seamlessly switch between devices as appropriate. Thus, the techniques and tools can allow users to seamlessly switch between viewing written instructions on mobile devices with screen and receiving audio task guidance for those same instructions via intelligent speaker devices. This can allow hands-free/eyes-free access to the written instruction, as appropriate, rather than locking people into one interaction modality (e.g., view/touch, or hear/speak). The techniques and tools can include sharing state between devices and applications in real-time, and at fine granularity. In some cases, the written instructions can be dynamically transformed by a computer system to make them amenable to the given interaction modalities (e.g., presenting overlays on documents, or splitting long sentences into shorter phrases when spoken to make a textual document amenable to use by a natural language digital assistant operating via intelligent speaker devices).

Thus, the techniques and tools discussed herein can present multiple different aspects that can technically improve over prior systems. For example, two different devices using different interaction modalities (such as an intelligent speaker device running a digital assistant as one device and application; and a tablet, laptop, or smartphone running a Web browser as another application) can work in tandem to provide task guidance for a given set of textual instructions.

The interactions in a session can be for a single user profile and can be grounded in a common document (e.g., a recipe loaded in a user's Web browser). This can include retrieving answers from the document itself (e.g., an ingredient listing, or a user comment, etc.), or using the document as context for a more general search such as a Web search. Further, the system can understand and be able to respond to natural language questions about the system state and progress (e.g., "how many steps are left?", "what's next?", "when did I put the chicken in the oven?") and natural language commands (e.g., "next step"). As an example of using the document as context for a Web search, the displayed document can be a recipe for scallops, and natural language user input can ask, "how do I know when they are cooked?" In response, the system can resolve the pronoun "they" to "scallops" using the document, and can issue a query to a Web search engine, with the query stating, "how do I know when scallops are cooked?"

As used herein, a user profile is a set of data that represents an entity such as a user, a group of users, a computing resource, etc. When references are made herein to a user profile performing actions (sending, receiving, etc.), those actions are considered to be performed by a user profile if they are performed by computer components in an environment where the user profile is active (such as where the user profile is logged into an environment and that environment controls the performance of the actions). Often such actions by or for a user profile are also performed by or for a user corresponding to the user profile. For example, this may be the case where a user profile is logged in and active in a computer application and/or a computing device that is performing actions for the user profile on behalf of a corresponding user. To provide some specific examples, this usage of terminology related to user profiles applies with references to a user profile providing user input, receiving responses, or otherwise interacting with computer components discussed herein (e.g., engaging in a session or a dialog between a digital assistant and a user profile).

The cooperating devices or applications can share state, which can be updated in real-time, and which can allow seamless transition between modalities. This state can be persisted as a session object and a user profile may connect to the session (in an authenticated fashion) from several devices to make progress, interact, or suspend while still engaging in the session and still utilizing the same state, such as a task state data structure. This contrasts with typical assumptions of one device for a user profile connecting to a remote session on a server to conduct actions asynchronously.

As discussed above, the underlying document may undergo dynamic transformations to better suit the interaction modalities, or to fit one such modality if the document is already well suited for the other modality (e.g., long steps may be subdivided for consumption through an audio channel, and steps may be labeled with sequential letters or numbers, which may include renumbering steps to account for the steps that have been subdivided). Likewise, interactive overlays may be presented over static text to allow users to track and update their progress, including via visual input such as touch and gestural commands directed to the display on the mobile device and via natural language commands directed to a natural language digital assistant.

Additionally, user input from the user profile can be provided to annotate the underlying documents, and those annotations can be surfaced the next time the user profile follows the same set of instructions (e.g., natural language user input may state, "remind me to double the sauce next time"). Such an annotation may be displayed on a working task document, and it may be spoken through a natural language output (e.g., through displayed text in a chat session with a digital assistant, or through audible speaking from a speaker device).

Existing systems can allow users limited casting of documents to and from mobile devices and intelligent speaker devices. For example, an intelligent speaker device can direct users to view documents on their smartphones (e.g., showing a list of search results, displaying structured or multimedia content, or sending a user to a Web page for more information). Likewise, users can send electronic books from their phone to their intelligent speaker device for an audiobook experience. In the latter case, some limited state is shared (progress through the document). However, such systems do not provide the improved cross-application or cross-device task guidance features discussed and claimed herein, and do not provide the same technical advantages as the features discussed herein.

The tools and techniques discussed herein can provide substantial benefits and can overcome problems discussed in the summary section above in ways that are not achieved with existing systems. For example, the use of the shared task document and shared task state data structure (such as the state-maintaining session object discussed above) for maintaining state can assist with maintaining a consistent state for multiple different modalities. Such documents and data structures can also allow for keeping track of where a user is in performing a task by allowing interactive features to check off task steps that are completed. And because such state can be maintained in the shared task state data structure, it can be available to different devices and applications using different modalities, conserving processor and/or network bandwidth resources as prior task steps do not need to be repeated on each device or application. Additionally, by converting a base document to include features that are more favorable for different modalities, the system can provide advantageous features, such as breaking down task steps into finer granularity to allow for more detailed guidance provided by a natural language digital assistant, and providing interactive overlays and task step labeling to aid in tracking state to assist in guidance provided on a display and by a natural language digital assistant. In sum, the tools and techniques discussed herein can overcome technical challenges of previous systems by providing different devices and/or applications that can work together using a common working digital task document and a common task state data structure to provide a seamless experience for a user profile, which can provide more efficient responses to user requests using the context provided by the digital task document and the task state data structure in any of multiple different interactive modalities. Thus, the features discussed herein can provide additional functionality and improve the computer system to provide task guidance in a more efficient and effective manner.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a client computing device and/or a computing device in an online Web service. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing computerized task guidance across devices and applications. An implementation of computerized task guidance across devices and applications may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level descriptions for operations performed by a computer, and should not be confused with acts performed by a human being, unless performance of an act by a human being (such as a "user") is explicitly noted. The actual computer operations corresponding to these terms vary depending on the implementation.

II. Computerized Task Guidance System

In the discussion of the task guidance system, note that communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

A. General Task Guidance System

Figure 2:
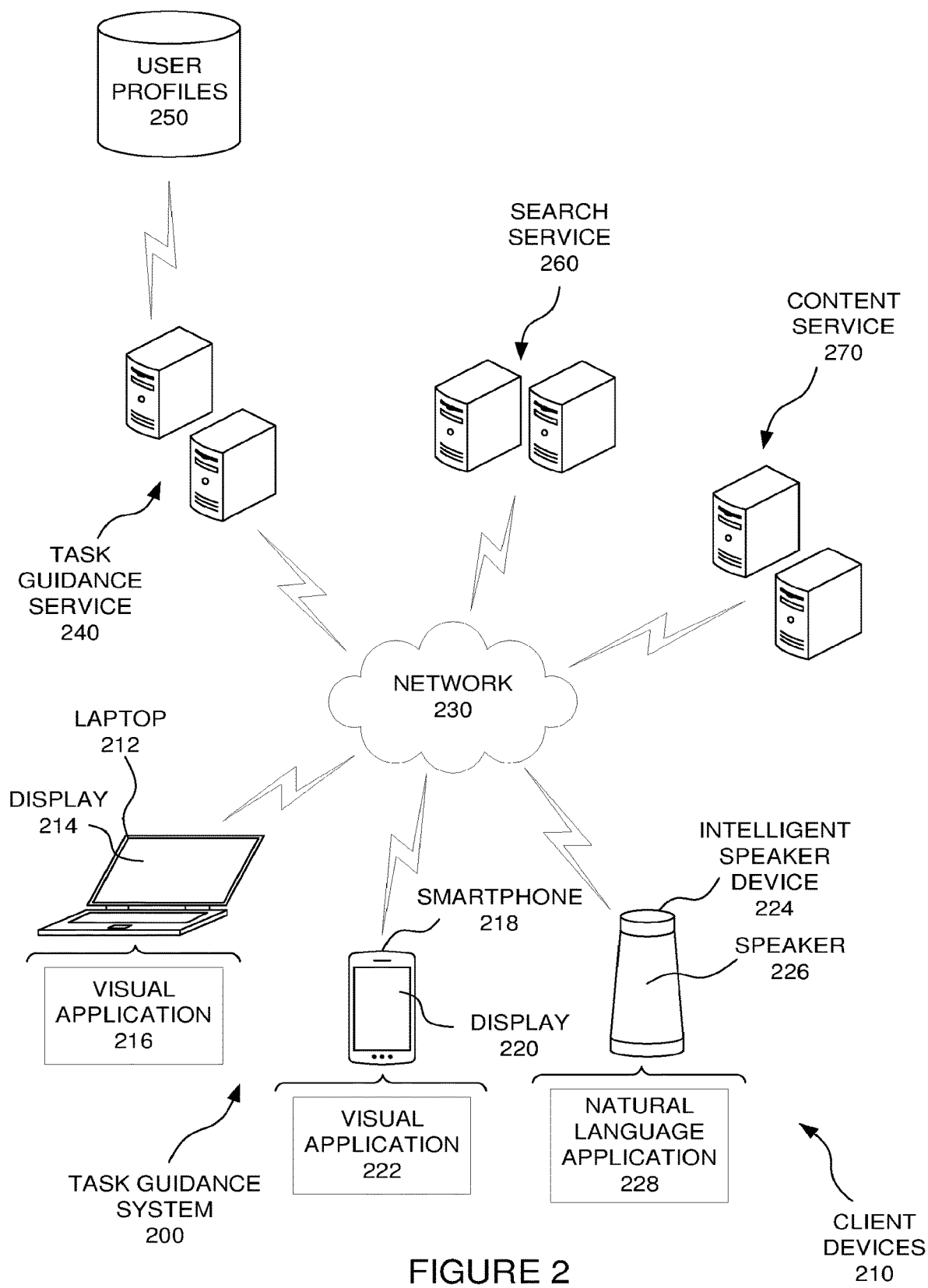
FIG. 2 is schematic diagram of a task guidance system.

Referring now to FIG. 2, components of a computerized task guidance system (200) will be discussed. Each of the components includes hardware, and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

The components of the task guidance system (200) can include client devices (210). For example, the client devices (210) can include a laptop (212), which can include a computer display (214), such as a touchscreen or other computer screen, and may include a running visual application (216). For example, the visual application (216) can be an application that is programmed to display a document on the display (214). For example, the visual application (216) may include a Web browser, which may include a browser plugin or extension that is programmed to operate and interact with other components to implement the task guidance features discussed herein, in conjunction with the Web browser. Other examples of visual applications may include email client applications, and word processing applications. The client devices may also include a smartphone (218) having a display (220) and a visual application (222), such as the types discussed above for the laptop (212). The client devices (210) may also include a intelligent speaker device (224), which can include a speaker (226) as an output device, and may run a natural language application (228), which can provide an interface for an intelligent digital assistant.

The different client devices (210) and different applications (216, 222, and 228) can implement different interactive modalities. For example, the visual applications (216 and 222) may each primarily utilize a visual input and visual output modality for user interaction, while the natural language application (228) may utilize a natural language modality such as a speech input (via a microphone in the intelligent speaker device (224)) and speech output modality. Some applications may implement mixed modalities, such as where input may be provided by visual indications directed to a display or natural language indications spoken into a microphone. The cross-device and cross-application tools and techniques discussed herein may be implemented with more than two client devices (and even more than three client devices), such as where a session includes user input and task guidance responses via the laptop (212), smartphone (218) and intelligent speaker device (224) of FIG. 2 for a single user profile and using a single working document and task state data structure.

The client devices (210) can be connected to computerized services through a computer network (230). For example, the client devices (210) can be connected to a task guidance service (240), which can utilize an authentication system to authenticate user profiles (250). When such user profile authentication is provided for a computerized communication session between a client device (210) and one of the services, then actions performed by such a client device (210) on behalf of the user profile (250) are considered herein to be actions of the user profile (250). For example, received user input can be considered to be received from the corresponding user profile (250), and content presented via a display (214 or 220) or a speaker (226) can be considered to be presented to the corresponding user profile (250). Similarly, data sent to the client device (210) for presentation on an output device such as a display (214 or 220) or a speaker (226) can be considered to be sent to the user profile (250) via the corresponding client device (210).

Information collected in the system may be associated with such a user profile. In collecting, storing, transmitting, and using such information, privacy of a corresponding user should be respected. For example, the task guidance system (200) may include opt-in or opt-out settings for user profiles to allow users to control how their information, and especially their personal information, is collected, stored, transmitted, and/or used in the task guidance system. Also, security measures such as data encryption and secure transmissions can be used to protect such information from being inadvertently exposed to third parties. Additionally, operations in the task guidance system (200) can be limited in accordance with appropriate privacy policies and user profile settings.

The task guidance service (240) can receive user input from a user profile (250) via the client devices (210) and can provide task guidance to an associated user profile (250). The client devices (210) can also interact with other services via the computer network (230), such as a search service (260) and a content service (270). For example, the search service (260) may receive queries from the client devices (210), and may provide responses to those queries, such as with search results that list items of content available from one or more content services (270). For example, the content items may be Web pages where the content service (270) is a Web serving service. Also, the task guidance service (240) itself may retrieve digital information from the search service (260) and/or the content service (270). Additionally, other services may be available via the client devices (210) and/or via the task guidance service (240), the search service (260), and/or the content service (270).

As discussed more below, the task guidance service (240) can provide synchronized task guidance via multiple user interaction modalities and via multiple client devices and/or applications. This can be done while interacting with a single user profile (250) and maintaining a state of task step completion for that user profile (250). This can allow the user profile (250) to provide user input and receive task guidance output via multiple interaction modalities in multiple applications and multiple devices. Moreover, the interactions can be grounded in a working task document and a task state data structure for the task session. With this approach, technical problems with prior systems that provided task guidance can be overcome, allowing the system to provide effective task guidance via multiple user interface modalities.

Some operations of the task guidance service (240) and the overall task guidance system (200) will be discussed with reference to FIGS. 3-5—though each of those Figures shows only some of the components illustrated as part of the task guidance system of FIG. 2. This discussion will also introduce specific components and acts of the task guidance system (200) in example implementations.

B. Initiation Input Response

Figure 3:
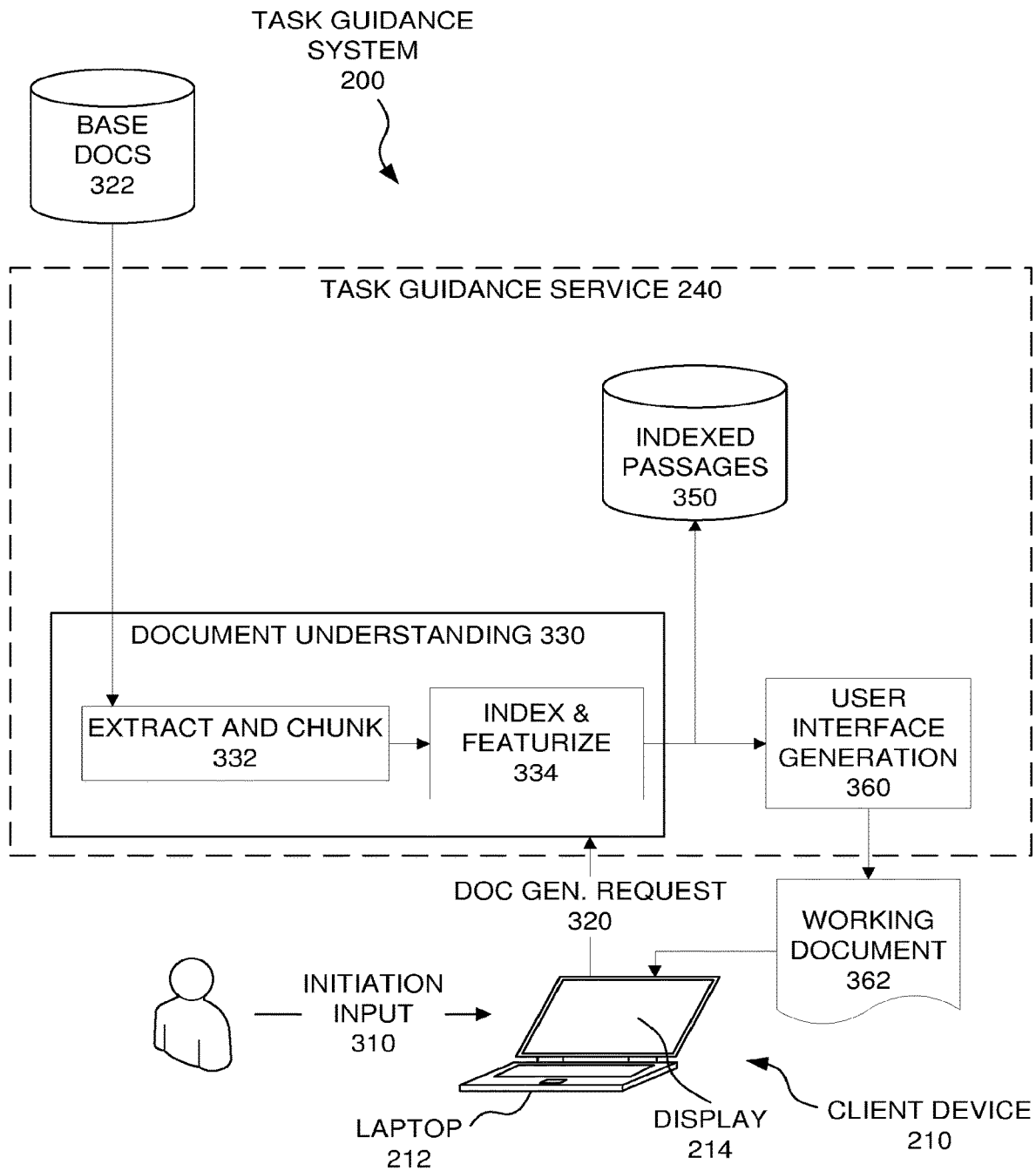
FIG. 3 is a schematic diagram of a task guidance system, illustrating a response of the system to an initiation input.

Referring now to FIG. 3, an initiation input (310) can be provided into a client device (210). The initiation input (310) can indicate that a task guidance session is to be initiated. For example, the initiation input may be user input directed to a displayed control on the display (214) while viewing a base document, or original document (the document used as the basis for the working document discussed herein). For example, the control may be a control for invoking a browser plugin that is programmed to operate on the client device (210). As another example, the initiation input (310) may be selecting a Web page to be viewed via a Web browser, where that page has been flagged as being formatted for multi-modality task guidance across applications and/or devices. As yet another example, initiation input (310) may be provided as natural language input, such as by a user speaking a natural language command to a device microphone, such as a microphone of an intelligent speaker device (224).

In response to the initiation input (310), the task guidance system (200) can perform the actions discussed in this section without the need for further user input. Similarly, the actions discussed with reference to each of FIGS. 4 and 5 below may each be performed in response to a single user input action discussed below, without the need for further user input. To start, the task guidance system (200) can send a document generation request (320) to a document understanding component (330). The document generation request (320) can prompt the document understanding component (330) to retrieve a base computer-readable document (322). For example, the base document (322) may be sent from the client device (210) with the document generation request. Alternatively, the document generation request (320) may provide retrieval information for the base document (322), such as a uniform resource locator for the base document (322).

The document understanding component (330) can perform operations on the base document (322) to convert the base document (322) into a form that is amenable to the providing of task guidance via multiple different user interaction modalities using the resulting task document. This may be done in different ways, but in one implementation, the document understanding component (330) can provide the base document to an extract and chunk component (332). The extract and chunk component (332) can parse the base document (322) to identify task instructions in the base document (322) and determine whether identified instructions are to be broken into smaller instruction steps. For example, the extract and chunk component (332) can utilize computer-readable rules that can dictate what instructions are to be broken into smaller instructions. For example, this can include computer rule-based grammatical analysis. As an example of such analysis, an instruction with multiple sentences that each include command language may be broken into multiple separate steps. As another example, the extract and chunk component (332) may identify and break up a single sentence into clauses that each includes a command. Also, if the base document (322) conforms to a standard schema, that schema can be incorporated into the rules for identifying and breaking up the instructions. For example, in a recipe, the schema may include a digital marking that identifies ingredients, a different digital marking that identifies preparation instructions, and so forth. The extract and chunk component (332) can identify such terms as it parses the base document (322).

The document understanding component (330) can also include an index and featurize component (334), which can utilize computer-based natural language understanding techniques. For example, the index and featurize component (334) may conduct named entity recognition, such as with the use of embeddings in neural networks utilizing vector word representations. In performing the document understanding, standard schema vocabulary words may be recognized in the base document to assist in breaking out the instructions and separating out entities for task instructions. With the index and featurize component (334), the named entity recognition can recognize the type of thing being referenced in a textual instruction in the base document (322) using trained models, such as neural network models. For example, the index and featurize component (334) may recognize that the phrase "medium skillet" in the base document (322) refers to a type of equipment used for the task and may assign an equipment named entity to the corresponding task step. As another example, the index and featurize component (334) may recognize that the phrase "high heat" refers to a cooking temperature and may assign a temperature named entity to that task. Such named entities can be indexed and used as features for responding to user input requests, such as natural language instructions or questions.

The task guidance service (240) can also label the identified steps from the base document (322). Such labeling allows different steps to be distinguished from each other. For example, a list of parts to be used in assembling an item may be labeled with sequential numbers or letters to distinguish the items from each other. Similarly, steps to be performed in assembling the item may also be labeled with sequential numbers or letters to distinguish the steps from each other. For example, for device assembly instructions, parts may be numbered one through ten, and the assembly steps may be lettered A through G. This labeling can include renumbering steps if a numbered list of steps from the base document (322) is broken into a greater number of steps. These labels may be displayed when the resulting working document is displayed, and may also be used in natural language dialogs, such as to map natural language user input to specific numbered instructions. As an example, natural language user input may say, "Mark step two as complete," and the computer system can respond by identifying the step labeled as step two and marking it complete.

Additionally, the index and featurize component (334) may insert interactive components into the resulting document, and those interactive components may be included as overlays on the resulting working document when displayed. As an example, the index and featurize component (334) may insert check boxes to allow items to be checked off when they are completed (such as when a corresponding ingredient has been used or a cooking action (e.g., chop the onions) has been performed). Such checkboxes may be checked off in response to user input utilizing different modalities from different devices or applications.

Utilizing acts such as those described above, the document understanding component (330) can generate indexed passages (350) from the base document (322). The task guidance service (240) can store the indexed passages (350). As an example, the indexed passages may be in the form of a set of JavaScript Object Notation (JSON) data, such as a JSON blob. The indexed passages (350) may be used for a current session, and may also be stored for use later in the same session or different sessions by the same user profile or different user profiles. For future sessions, the task guidance service (240) may receive a document generation request (320) and may respond by determining whether the base document (322) has changed since a corresponding set of indexed passages (350) was generated by the document understanding component (330). If the base document (322) has not changed, then the stored indexed passages (350) can be used without performing document understanding processes on the base document (322). If the base document (322) has changed or if there are no corresponding indexed passages (350) for the base document (322), then the document understanding component (330) can operate on the base document (322) to generate indexed passages (350) corresponding to the base document (322), using techniques such as those discussed above.

The task guidance service (240) can also generate a user interface via a user interface generation component (360). For example, user interface generation can use the base document as a framework, and use the indexed passages (350) to apply overlays (e.g., interactive lists, broken up steps, etc.), to insert suggestions as to questions that may be asked or tasks that may be performed in conjunction with the indexed passages (350), and to combine features from the indexed passages (350) with features already present in the base document (322) (such as advertisements in the base document (322)).

The user interface generation component (360) can thereby produce a displayable working document (362), which can include elements from the corresponding base document (322) and elements from the indexed passages (350). As an example, the working document (362) can be a standard Web page, such as a page using hypertext markup language. Such a page may include additional features by reference, such as by referencing images, advertisements or other Web page features. As used herein, the indexed passages (350), which are used in generating the working document (362) to be displayed, can be considered to be a precursor version of the working document (362), so that references to acting on the working document (362) (using the working document, accessing the working document, retrieving data from the working document, etc.) may be fulfilled by acting on the underlying data that is particular to the working document (362). For example, references to use of the working document (362) or accessing the working document (362) in generating responses to user input may be fulfilled by the use of or accessing the indexed passages (350) that are versions of the working document (362) (such as precursors to the working document or working data derived from the working document), unless the discussion specifies that the indexed passages (350) or other precursor data is separate from the displayed working document (362). Stated another way, the indexed passages and the resulting corresponding displayable working document can be considered to be the same document, unless it is stated otherwise.

The task guidance service (240) can send the resulting working document (362) to the client device (210) for display on a computer display (214) using a visual application (216) (see also FIG. 2.).

The task guidance service (240) may perform actions differently than described above to produce a working document. For example, in some scenarios it may be advantageous to utilize set word or phrase mappings to entities to be utilized in indexing the indexed passages (350) from the base documents (322), rather than utilizing neural networks or similar techniques. Also, some techniques may perform fewer than all the techniques discussed above. For example, in some implementations, the instructions may be broken into smaller chunks and labeled without performing language understanding techniques such as named entity recognition.

C. Natural Language Input Response

Figure 4:
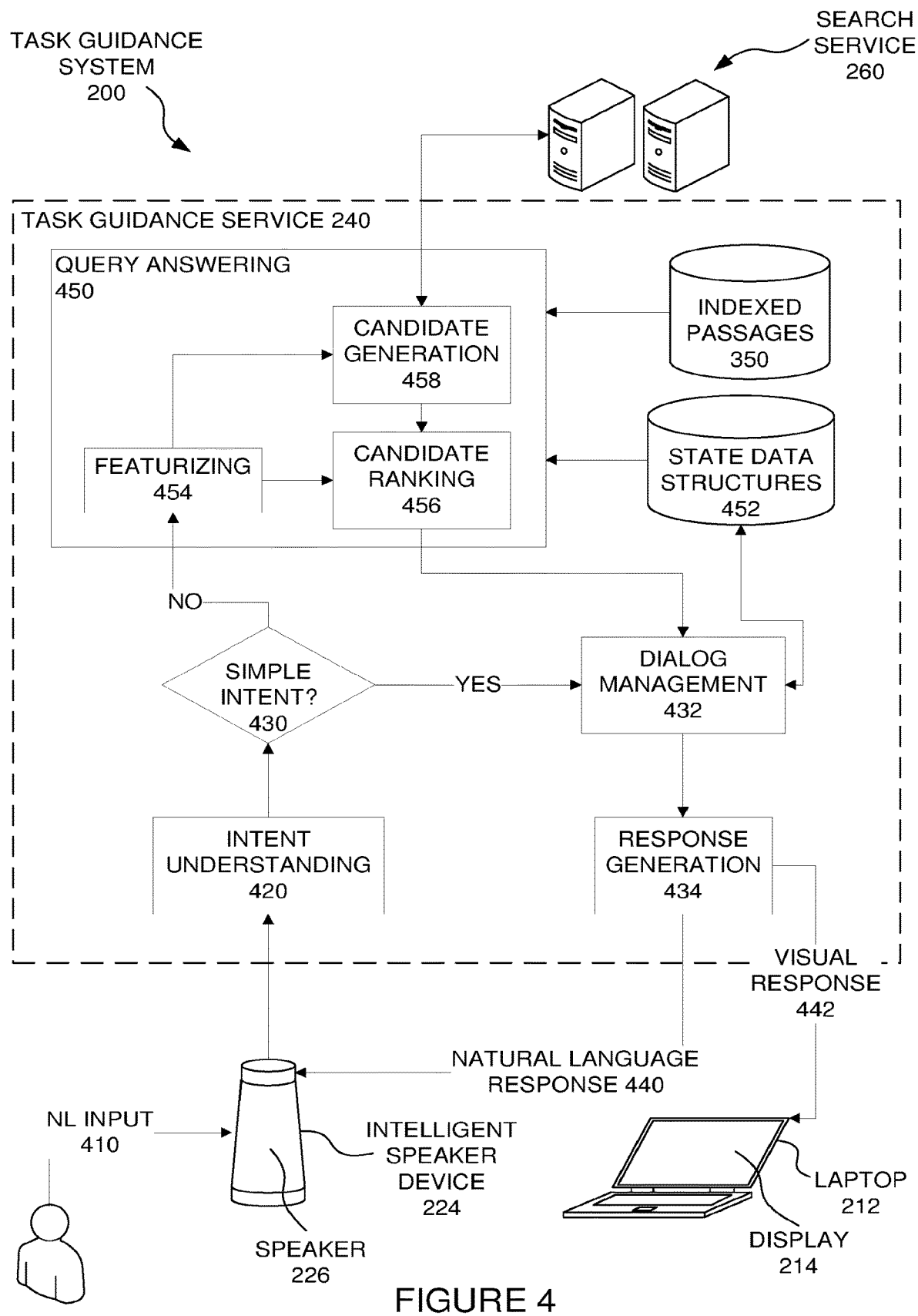
FIG. 4 is a schematic diagram of a task guidance system, illustrating a response of the system to a natural language input.

Referring now to FIG. 4, response of the task guidance system (200) to a natural language user input (410) regarding a working document (362) will be discussed. In this situation, a single user profile can be logged into an intelligent speaker device (224) and into a laptop (212) (by being authenticated through those devices using standard authentication techniques). Natural language input (410) can be received from a user associated with the user profile. For example, the natural language input (410) can be received at a client device such as an intelligent speaker device (224) in the form of audible speaking, or in the form of natural language text entered through a keyboard or other text input device.

In the case of audible input, the input can be processed using a speech-to-text component that can be part of the intent understanding component (420). The speech-to-text component may use one or more existing speech-to-text processes and may even invoke an existing speech-to-text engine by passing the speech to the existing speech-to-text engine and receiving results from the engine. For example, the speech-to-text component may utilize an existing overall process such as a Hidden-Markov Model-based process, a dynamic time warping process, or a neural network process. The speech-to-text component may also use one or more performance improving techniques, such as context dependency; cepstral normalization; vocal tract length normalization; maximum likelihood linear regression; delta and delta-delta coefficients; heteroscedastic linear discriminant analysis (LDA); splicing and an LDA-based projection followed by heteroscedastic linear discriminant analysis or a global semi-tied co-variance transform; discriminative training techniques; and/or other speech-to-text performance enhancing techniques.

Data representing text of natural language instructions (whether received as text or produced by the speech-to-text component) can be provided to a language understanding component, which can be part of the intent understanding component (420). As an example, a pre-existing language understanding component may be invoked by passing the natural language text (and possibly other information such as a key and a conversation identifier) to the component with a request to return intents representing the meaning(s) of the natural language text. Different keys and/or application identifiers submitted to the language understanding component may be used for different natural languages, thereby signaling to the language understanding component which language is being used. The language understanding component may include one or more known components for natural language understanding. In one example, the natural language understanding component may use multiclass classification, for example via a neural network with softmax output, multinomial logistic regression, Naïve Bayes classification, and other machine learning techniques. More generally, examples of the language understanding component may utilize a lexicon of the natural language, as well as a parser and grammar rules to break each natural language phrase into a data representation of the phrase. The language understanding component may also utilize a semantic theory to guide comprehension, such as a theory based on naïve semantics, stochastic semantic analysis, and/or pragmatics to derive meaning from context. Also, the language understanding component may incorporate logical inference techniques such as by mapping a derived meaning into a set of assertions in predicate logic, and then using logical deduction to arrive at conclusions as to the meaning of the text. Using results of such language understanding techniques, the language understanding component can map the resulting derived meanings to one or more intents to be passed to an intent routing component (430).

The intent routing component (430) can determine whether the intent is a simple intent that can be handled without invoking a query answering component (450), or whether the intent is a more complex intent that will be operated upon with the query answering component (450). For example, the intent routing component (430) may search a pre-defined computer-readable list of intents that are indicated to be simple. Each such "simple" intent can have a corresponding response (or set of responses) defined in the task guidance service (240). This defined response can be accessed by the intent routing component (430) and passed to the dialog management component (432). Alternatively, the intent itself can be passed to the dialog management component (432), and the dialog management component (432) can determine the corresponding general response (such as checking off a list item as being completed, and/or reading the next list item that has not yet been completed).

If the intent is determined to be simple intent, the intent routing component (430) can pass the intent to a dialog management component (432). The dialog management component (432) can access and possibly revise a state data structure (452) in response to receiving the intent. A state data structure (452) can be used for each task session with a user profile interacting with a particular working document. Indeed, as used herein, a session is considered to continue so long as the same state document is being maintained to track the state for the same working document and the same user profile. This may be true even if there is a pause in which the user profile is not connected to or authenticated with the task guidance service (240) for a period of time. As with the indexed passages (350), the state data structures (452) may take any of various forms. In one implementation, each state data structure (452) may be a JSON structure, such as a JSON blob. The dialog management component (432) can utilize the intent and the corresponding state data structure (452) in forming a response. For example, the dialog management component (432) may receive an intent along with a computer-readable identifier associated with the received intent. That identifier can be associated with the session, allowing the dialog management component to access the state data structure (452) as well as other data, such as preference settings for the corresponding user profile, and possibly data concerning previous received intents and responses from the session. Indeed, at least some such data may be included in the state data structure (452) for the session.

As an example, if the received "intent" were to mark as complete the next task step (that is not yet marked as complete), then the dialog management component (432) can parse though the state data structure (452), to identify the first task step not marked as completed. For example, if there were ten steps numbered one through ten, and the dialog management component (432) determined that steps one through five were marked complete in the state data structure (452), then the dialog management component (432) could determine that the response is to mark step number six as being complete. The dialog management component (432) can send a general indicator of the response to a response generation component (434).

The response generation component (434) can generate the particular response(s) to the natural language input (410). For example, the response may include a natural language response (440) in the form of a dialog script sent to the intelligent speaker device (224) in the form of natural language text or audio speech (such as "item number six is now complete). The response may also include a visual response (442), which may be in the form of an update to the display of the working document on the display (214) of the laptop (212) in the example illustrated in FIG. 4 (such as marking step number six as being complete in the working document, such as by placing an X in a checkbox for step number six). A response may be a visual and natural language response. For example, a response may include a natural language text script that is displayed on the display (214) of the laptop (212), such as in a chat window on a sidebar of a displayed recipe. Such a response may be provided along with other responses, such as an audible natural language response on the same device or a different device, and a visual response such as a visual indication that a displayed step is complete (e.g., a check mark).

Referring back to the intent routing component (430), if the intent routing component determines that the intent is not a simple intent, then the intent can be passed to the query answering component (450). The query answering component (450) can receive the intent at a featurizing component (454) in the query answering component (450). The featurizing component (454) can perform operations such as named entity recognition on the received intent to determine one or more entities for the received intent. For example, if the intent were to determine when an "onion" is to be used in a preparing a recipe, the featurizing component may recognize that the onion is a particular type of entity (an ingredient). The featurizing component (454) may also generate other features, such as a feature indicating a title of the recipe, or a general type of food being prepared. For example, the featurizing component may retrieve such information from the indexed passages (350) and/or from the state data structure (452). For example, if the intent indicates the question is whether to include the onion (an ingredient entity) now, then the featurizing component may include a feature indicating the title of the recipe being prepared (e.g., bread), and a feature indicating the current step in the task (i.e., the first task step that is not marked as completed, such as mixing the dry ingredients). The type of recipe can be extracted from the indexed passages (350), and the current step in the task can be extracted from the state data structure (452). The resulting features can be provided to a candidate generation component (458) and to a candidate ranking component (456).

The candidate generation component (458) can generate candidates, which are possible responses to the natural language input (410). For example, the candidate generation component may retrieve potential responses from the indexed passages (350), which can include passages from the current working document, or even passages from other working documents, including comments that appear in other working documents. The candidate generation component (458) may also send one or more queries to the search service (260) to retrieve candidate responses. All the candidate responses can be provided to the candidate ranking component (456) along with features associated with the candidates (such as an indication of the source of each candidate).

The candidate ranking component (456) can rank the candidates using one or more of various ranking techniques. For example, the candidate ranking component (456) may be implemented as a classifier that determines a confidence level that a candidate response answers a question indicated by the received intent. In doing this, the candidate ranking component (456) may combine weighted values from multiple different ranking features. This may be done with a model that is trained with training data to learn what individual features to expect for a type of question, and what overlap to expect between the question and answer. For the question, this technique may consider factors such as the determined intents, the entities, words in the natural language input (410), as well as multiple-word combinations (bi-grams, tri-grams, etc.). For the answers, this technique may consider factors such as where the answer was found (ingredient list, cooking instructions, a Web page returned from a Web search, etc.), what entities are mentioned in the answer, and what words and multi-word combinations (bi-grams, tri-grams, etc.) are in the answer. For example, if the natural language input is "how hot do I preheat the oven," the candidate ranking component may expect the temperature entity to be found in the answer, the answer to be found in the instructions for a recipe, and some overlap on the word "oven" so that the word "oven" (or possibly a synonym of the word "oven") appears in the answer. Other different types of features may be used.

With the candidates having been ranked by the candidate ranking component (456), the highest-ranking candidate response may be sent to the dialog management component (432) as a general response. The dialog management component (432) can refine the response in accordance with the current state of the working document and the current state of the audio dialog, as indicated by the state data structure (452), and possibly other state-indicating data. The dialog management component (432) can pass this refined response to the response generation component (434) to generate specific responses, such as a natural language response (440) and/or a visual response (442). A visual response may be displayed on the display (214) and/or a natural language response (440) may be audibly spoken by the speaker (226) of the intelligent speaker device (224).

D. Visual Input Response

Figure 5:
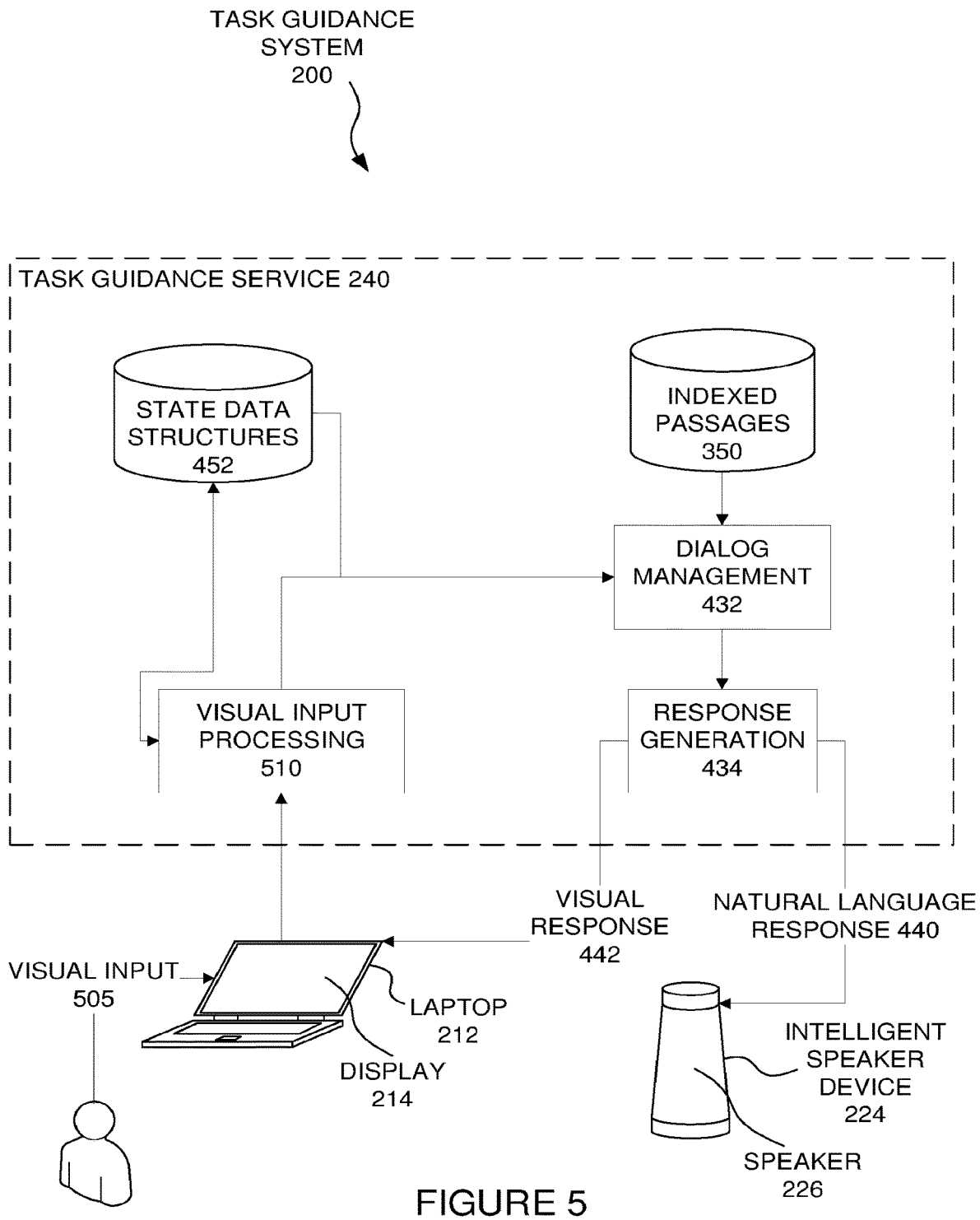
FIG. 5 is a schematic diagram of a task guidance system, illustrating a response of the system to a visual input.

Referring now to FIG. 5, a response of the task guidance system (200) to a visual input (505) will be discussed. As used herein, a visual input is a user input directed at a displayed element of a computer display (214). In this example, the visual input (505) can be directed at an element on the display (214) of the laptop (212). The laptop (212) can respond to the visual input (505) by sending a representation of the input to the visual input processing component (510). For example, if the user input is a touch input on a labeled task step displayed on the display (214), then the laptop (212) can send, to a visual input processing component (510) of the task guidance service (240), an indication that the touched task step has been selected.

The visual input processing component (510) can process the visual input indicator to determine what was intended by the visual input. For example, where the visual input (505) is a touch of a labeled task step, the visual input processing component (510) can determine that the task step is not currently marked as complete, by retrieving state data from the corresponding state data structure (452). From this, the visual input processing component (510) can determine that the intent to mark the task step as complete. The visual input processing component (510) can send an indication of this intent to the dialog management component (432). The dialog management component (432) can use the indexed passages and the state data structures (452) to generate a suitable general response. For example, the intent may be mapped to an appropriate rule for generating such a response. As an example, the dialog management component may determine that a natural language dialog script should state that step 5 is now complete, and that step five should be marked as complete on the working document displayed on the laptop (212). The dialog management component (432) can mark step five as complete on the state data structure (452) and can send general response indications to the response generation component (434). The response generation component (434) can generate and send a corresponding visual response (442) to the laptop (212) and/or a corresponding natural language response (440) to the intelligent speaker device (224), indicating that step five is complete, for example.

E. Visual User Interface Document Examples

Figure 6:
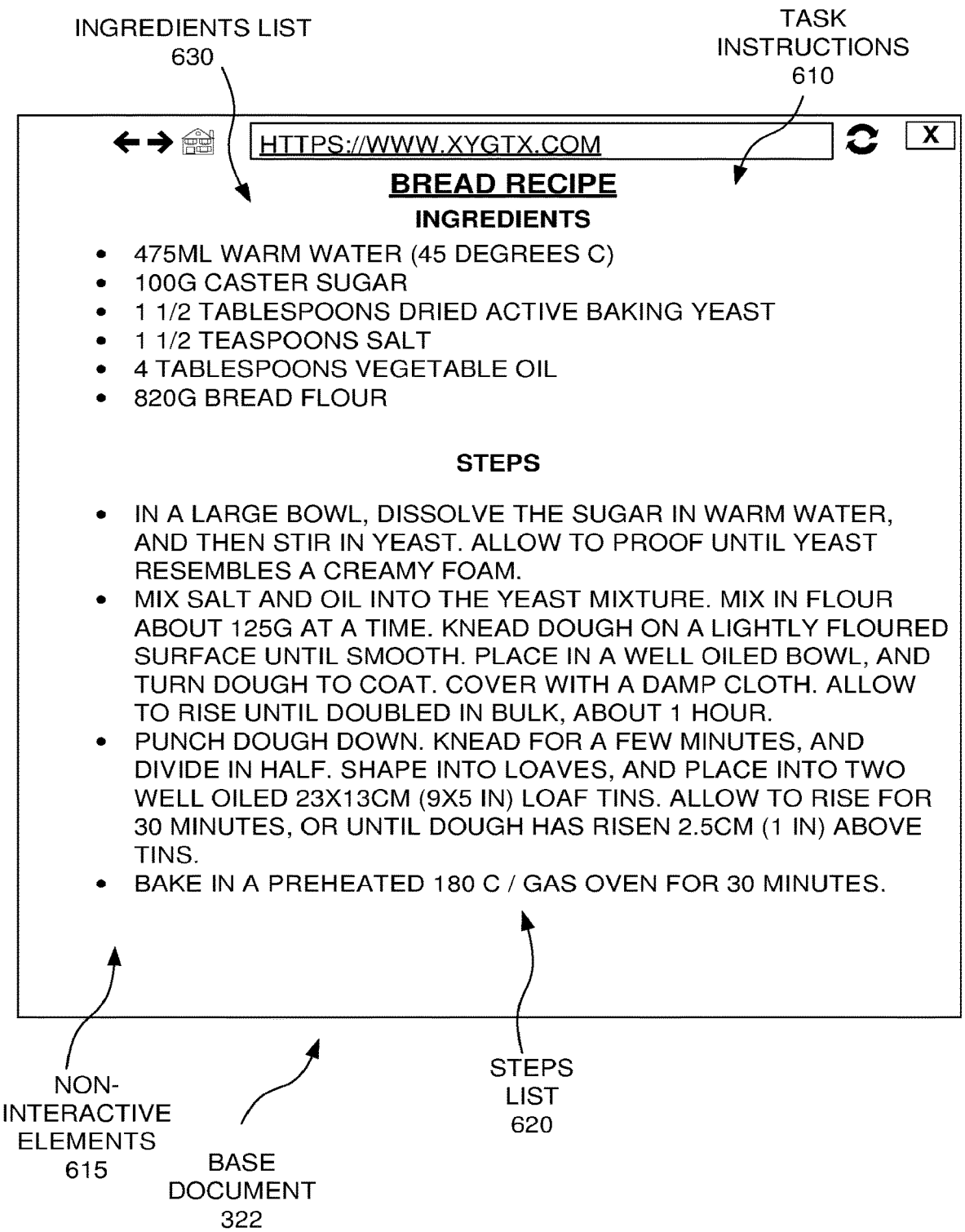
FIG. 6 is an illustration of a displayed base document.

Referring now to FIG. 6, an example of a visual user interface display of a base document (322) is illustrated. In this example, the base document (322) is a recipe that includes task instructions (610) for preparing the recipe. The task instructions (610) can include non-interactive task elements (615), including an ingredients list (630), listing the ingredients for the recipe, and a steps list (620), listing the steps to perform the recipe.

Figure 7:
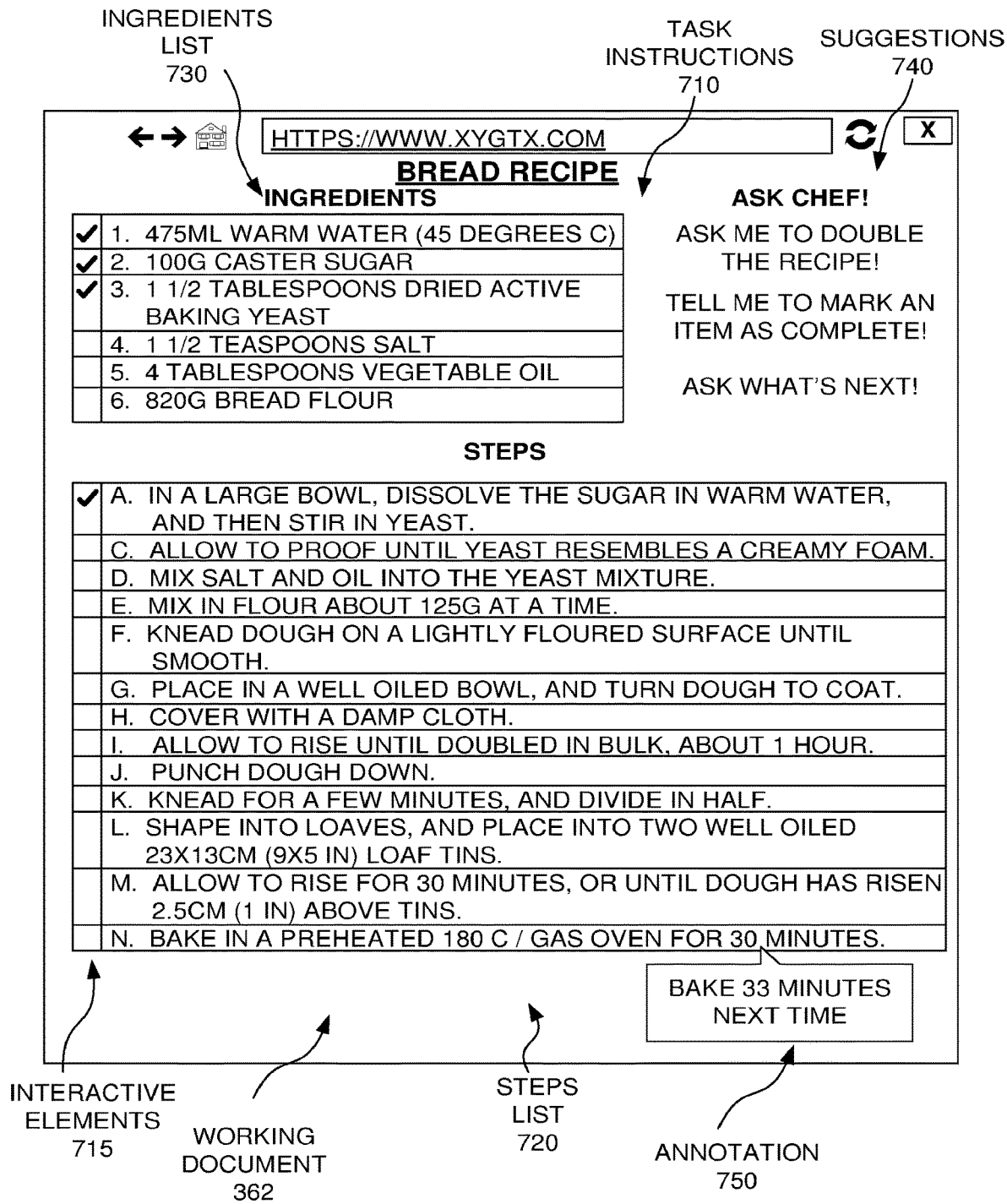
FIG. 7 is an illustration of a displayed working document based on the base document of FIG. 6.

The base document (322) illustrated in FIG. 6 can be processed as described above to generate the working document 362 illustrated in FIG. 7. The working document of FIG. 7 can still include task instructions (710), which can include interactive elements (715), including an ingredients list (730) and a steps list (720). Note that the ingredients on the ingredients list (730) may be considered steps in the task, where the use of an ingredient in the recipe is the corresponding task step for that ingredient item in the ingredients list (730). The displayed working document (362) can also include a list of suggestions (740), which can be suggestions of operations to ask the system to perform. For example, one of the suggestions is, "ASK ME TO DOUBLE THE RECIPE!" As an example, natural language user input may be provided to a natural language digital assistant, saying, "ask chef to double the recipe." The task guidance system (200) can respond by processing that natural language input as discussed above with reference to FIG. 4. The task guidance service (240) can provide a response that identifies and doubles all the ingredient quantity values in the recipe. For example, this can include entity recognition that recognizes those values as being ingredient quantity values. Other values may be doubled as well. For example, the statement "DIVIDE IN HALF" in step K can be revised to say, "DIVIDE INTO FOURTHS", and the statement "PLACE INTO TWO ... LOAF TINS" in step L can be revised to say, "PLACE INTO FOUR ... LOAF TINS"

As can be seen in FIGS. 6-7, and as discussed above with reference to FIG. 3, the task steps in the steps list (620) of the base document (322) are broken into more steps, which can provide finer granularity in tracking state. This can aid in providing task guidance, especially where such guidance involves a natural language digital assistant, as discussed herein. For example, some of the steps in the steps list (620) of the base document (322) include multiple sentences. The task guidance system (200) has broken up the steps so that each of those sentences is a single step in the steps list (720) of the working document (362). The task guidance system (200) could break up the steps to even finer granularity, such as by breaking up some sentences into multiple steps. For example, the step "KNEAD FOR A FEW MINUTES, AND DIVIDE IN HALF" (step K in the steps list (720) of FIG. 7) can be broken into two separate steps: "KNEAD FOR A FEW MINUTES" and "DIVIDE IN HALF".

In addition to breaking the steps in the steps list (720) to produce finer granularity, the task guidance system (200) can add an overlay that may reformat the elements (715) of the task instructions (710), and that can make the elements (715) interactive. For example, in the example of FIG. 7, interactive checkboxes are included on the left of each labeled element (715) of the task instructions (710), including the steps of the steps list (720) and the ingredients of the ingredients list (730). Visual input directed at a checkbox can toggle the corresponding element (715) between being marked completed (with a check mark in the checkbox) and not being marked completed (without a check mark in the box). Similarly, natural language input can be provided to mark a check box and an associated instruction element (715) as completed, or to unmark it, so that it is not marked as completed. As discussed above with reference to FIGS. 4-5, the task guidance system (200) can respond to such input by updating the visual elements on the working document (362) for a session, and by updating the corresponding state data structure (452) for the session.

The working document (362) can also include annotations (750), which can be stored with the task state data structure and/or the indexed passages and can be included in the working document (362), as illustrated in FIG. 7. In the example of FIG. 7, the annotation (750) states, "BAKE 33 MINUTES NEXT TIME." Such a statement can be included in response to visual user input and/or natural language user input, and can be displayed on the working document (362) when the same user profile subsequently displays the working document (362). Such annotations may also be used to provide responses to natural language questions for the same user profile and/or for other user profiles.

Accordingly, the tools and techniques discussed herein, such as the breaking of the instruction elements into finer granularity, and the introduction of interactive features in the working document (362) can make the working document (362) more efficient and effective for use with multiple different interactive modalities, such as visual element-based interaction and natural language-based interaction. For example, the interactive nature of the interactive elements (715) and the finer granularity of those interactive elements (715) can facilitate tracking of the state of completing a task and providing appropriate guidance for a particular state of task completion, not only through visual display of the textual data of the interactive elements (715) but also through communication in natural language with a natural language digital assistant. For example, these changes made in generating the working document (362) can allow for the tracking of state (using the state data structure, as discussed above), and can allow for that state to be tracked and communicated with finer granularity. The additional of such features, along with the display of the working document on a different device or with a different application than is used for the digital assistant, can overcome at least some of the technical problems that would otherwise be present when using a digital assistant to provide task guidance, such as by facilitating tracking of state for long lists of instructions, or when user input dictates jumping around in instruction steps, rather than moving strictly sequentially through the instructions.

III. Computerized Task Guidance Techniques

Several techniques for computerized task guidance across devices and applications will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic. Features discussed in each of the techniques below may be combined with each other in different combinations, including combining features from a technique discussed with reference to one figure in a technique discussed with reference to a different figure. Also, a computer system may include means for performing each of the acts discussed in the context of these techniques, in different combinations.

Figure 8:
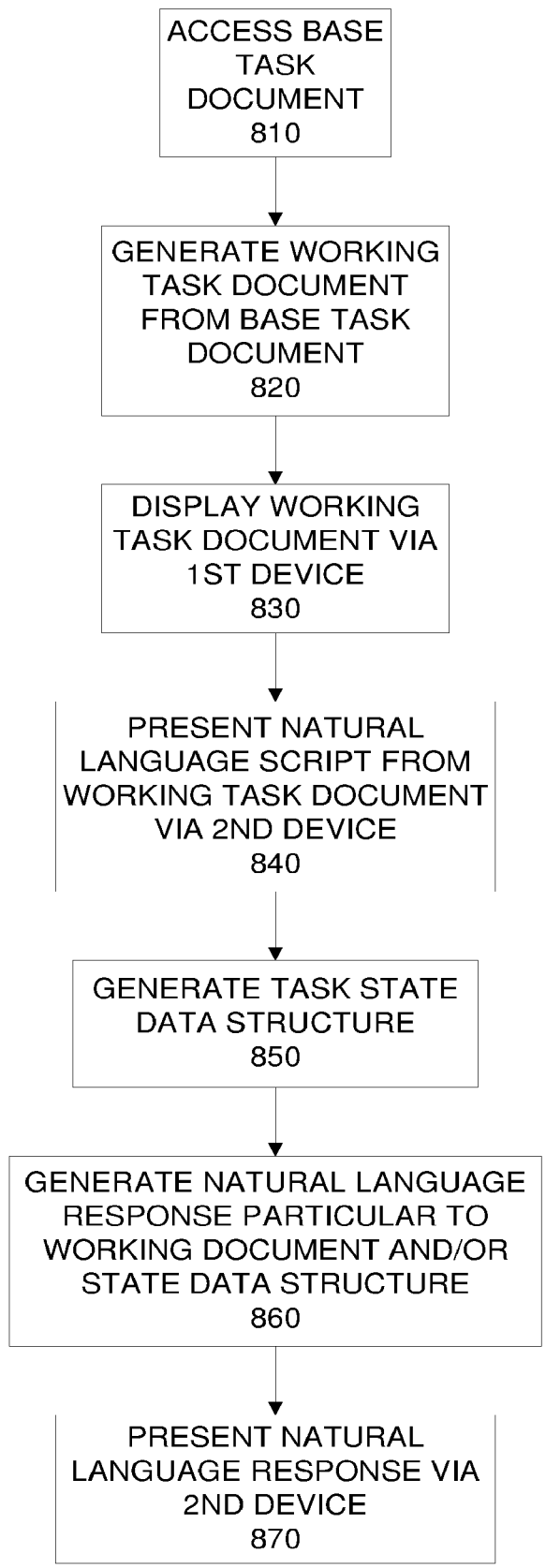
FIG. 8 is a flowchart of a technique for cross-device computerized task guidance.

A. FIG. 8 Technique

Referring to FIG. 8, a cross-device computerized task guidance technique will be discussed. The technique can include accessing (810) a digital base task document that is configured to be displayed on a computer display, with the base task document including textual task instructions for completing a task. The technique can further include generating (820) a digital working task document from the base task document. The working task document can include textual task instructions, and it can include format changes relative to the base task document. The format changes can include a set of one or more changes that format the working task document for use in conducting a natural language dialog including natural language user input from a user profile and responsive natural language scripts from a digital assistant operating in a computer system that can perform the technique. The technique can also include displaying (830) at least a portion of the working task document on a computer display via a first computing device. The displaying (830) of the working task document and the natural language dialog can both provide the user profile with guidance for performing the task based on the working task document. Additionally, the technique of FIG. 8 can include presenting (840) a natural language script, including using information from at least a portion of the working task document via a second computing device that is separate from the first computing device. The presenting (840) of the natural language script can be performed as part of the natural language dialog between the digital assistant and the user profile. Each of the first and second computing devices can be configured to present textual data based on the working task document as user output without requiring involvement of the other computing device (though one of the computing devices may receive updated data in response to an update prompted by the other computing device). The technique of FIG. 8 can also include generating (850) a computer-readable task state data structure that represents a state of interaction with the working task document. The task state data structure can be accessible via the first computing device and via the second computing device. Indeed, each of the first computing device and the second computing device can be configured to retrieve data from the task state data structure and to update the task state data structure without requiring involvement of the other computing device (though one of the computing devices may receive updated data in response to the other computing device updating the task state data structure). In response to receiving a natural language user input command via the second computing device as part of the natural language dialog, the technique can include generating (860) a natural language response that is particular to one or both of the task state data structure and the working task document. The generating (860) of the natural language response can also use one or both of the task state data structure and the working task document. The technique of FIG. 8 can also include presenting (870) the natural language response via the second computing device. The technique of FIG. 8 may also include one or more of the features listed below with reference to this technique or the other techniques herein in any combination.

The technique of FIG. 8 can include, in response to receiving visual user input via the first computing device, performing an update to the task state data structure to represent the visual user input. The visual input can be directed at an item on the working task document on the computer display. Also, the visual user input can indicate a state of progress in completing the task, where the natural language response can reflect the update to the task state data structure. The visual user input and the update to the task state data structure can both indicate completion of a step in the task, with the visual user input being directed to a representation of the step in the task on a display of the first computing device.

The set of one or more changes in the technique of FIG. 8 include breaking down a step in the task instructions into smaller steps.

The set of one or more changes in the technique of FIG. 8 can include formatting a step in the task instructions to be interactively marked as one of multiple available states, such as completed or not completed. The technique may include marking for additional available states. For example, there may be multiple not-completed states, such as an in-progress state and a not-started state. In such a scenario, the task instruction may be interactively marked as one of multiple available states, including not started, in progress, and completed. Such states may be referred to using different language, or no language at all, in different implementations.

The set of one or more changes in the technique of FIG. 8 can include labeling steps in the task instructions that are not labeled in the base task document, with the labeling including labeling each of the labeled steps with a label to distinguish that step from other steps in the task instructions. For example, the labels may be sequential numbers or sequential letters. As a specific example, some steps may be labeled with the labels 1, 2, 3, 4 and other steps may be labeled with the labels A, B, C, D, to distinguish the steps from each other. Thus, "step 2" refers to a specific label and a specific corresponding step, and "step B" refers to a different label and a different corresponding step. As another example, ingredients may be numbered to distinguish ingredients from each other, and instructional steps may be separately numbered to distinguish the instructional steps from each other. In this example, "ingredient 2" can refer to a specific ingredient (e.g., one egg), and "step 2" can refer to a specific instructional step (e.g., stir the egg in a bowl and add it to the mixture). Note that, as used herein in this context, lists of items such as ingredients or parts may be considered steps in task instructions, corresponding to the use of the corresponding items in performing the task.

The task state data structure and the working task document may be separate data structures, or they may both be part of the same overall data structure.

The technique of FIG. 8 may further include the following: receiving from the user profile an annotating user input including an annotation for the working task document; responding to the annotating user input by saving the annotation in connection with the working task document and the user profile; after saving the annotation, receiving a subsequent request from the user profile for a presentation of the working task document; and providing the annotation and the working task document in response to the subsequent request.

The generating (860) of the natural language response can include using the working task document as a context for running a computerized search to retrieve results that are outside of the working task document, outside of the base task document, and outside of the task state data structure.

The generating (860) of the natural language response can include accessing the task state data structure, wherein the natural language response includes a statement about a state of performance of the task as represented in the task state data structure.

The generating (860) of the natural language response can include accessing the working task document, wherein the natural language response includes a statement about data in the working task document.

Figure 9:
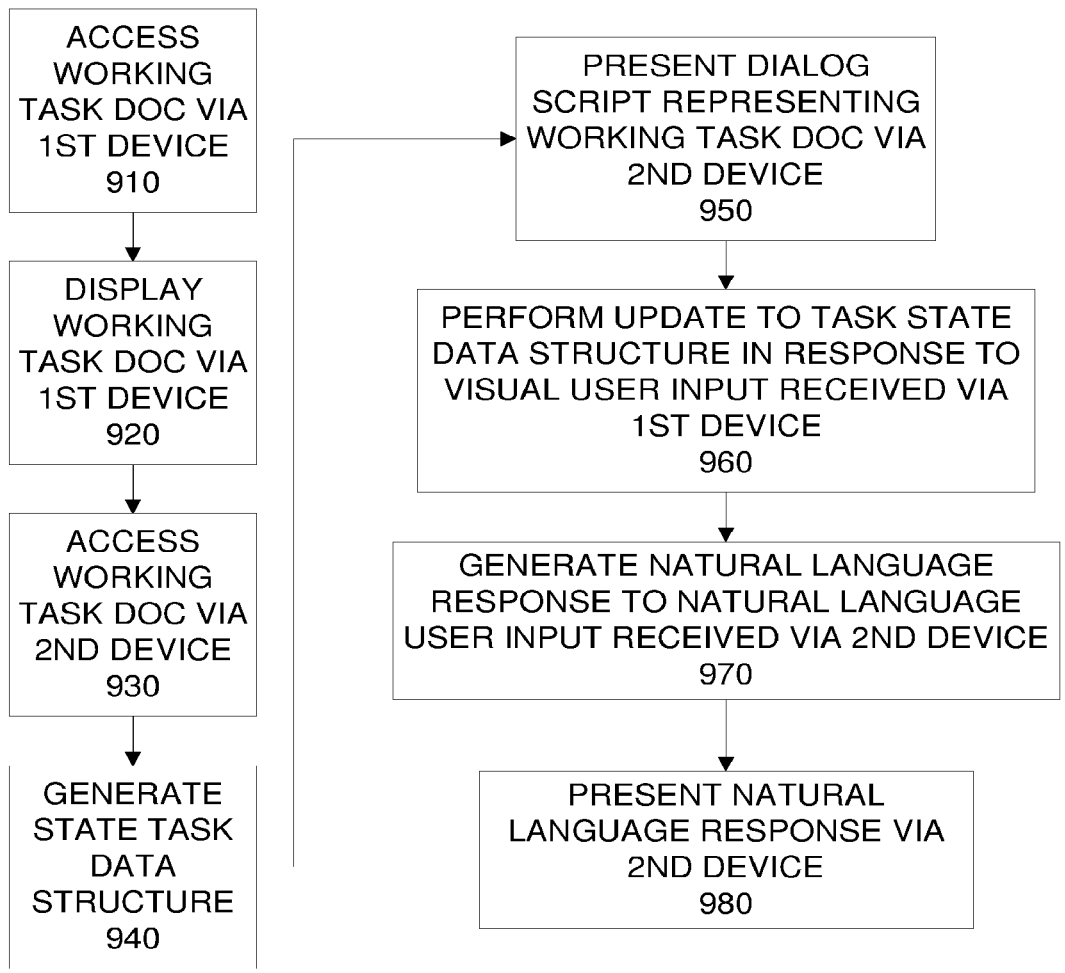
FIG. 9 is a flowchart of another technique for cross-device computerized task guidance.

B. FIG. 9 Technique

Referring now to FIG. 9, another cross-device computerized task guidance technique will be discussed. The technique can include accessing (910) via a first computing device, a digital working task document including a textual task description describing task steps to be completed in performing a task. The technique can also include displaying (920) at least a portion of the working task document on a display via the first computing device. The technique can further include accessing (930) at least a portion of the working task document via a second computing device that is separate from the first computing device. Moreover, the technique can include generating (940) a computer-readable task state data structure that represents a state of interaction with the working task document, with the task state data structure being accessible via the first computing device and the second computing device. A natural language dialog script can be presented (950), with the dialog script representing at least a portion of the working task document via a second computing device. In response to receiving visual user input via the first computing device, the technique can include perfuming (960) an update to the task state data structure to represent the visual user input. The visual user input can be directed at an item on the working task document on the display, and the visual user input can indicate a state of progress in completing the task (such as input indicating a task step is to be marked complete). In response to receiving a natural language user input command via the second computing device, the technique can include generating (970) a natural language response that is particular to the task state data structure. The generating (970) of the natural language response can include accessing the task state data structure, and with the natural language response providing guidance for performing the task and representing the update to the task state data structure. Also, the technique can include presenting (980) the natural language response via the second computing device. The technique of FIG. 9 may also include one or more of the features listed below with reference to this technique or the other techniques herein in any combination.

The technique of FIG. 9 can further include accessing a digital base task document that is configured to be displayed on the display, with the base task document including textual task instructions for completing the task. The technique can also include generating the digital working task document from the base task document, with the digital working task document including textual task instructions in an overlay that includes format changes relative to the base task document. The format changes can include a set of one or more changes that format the digital working task document for use in conducting a natural language dialog including natural language user input from a user profile and responsive natural language scripts from a digital assistant.

The technique of FIG. 9 can also include, in response to the receiving of the natural language user input command via the second computing device, perfuming a second update to the task state data structure to represent the natural language user input command and updating the at least a portion of the working task document on a computer display via the first computing device to represent the second update to the task state data structure. The second update may include inserting in the task state data structure an indicator that a task step in the working task document is completed.

The first and second computing devices can each be configured to present textual data from the working task document as user output without requiring involvement of the other computing device.

Also, each of the first and second computing devices can be configured to retrieve data from the task state data structure and to update the task state data structure without requiring involvement of the other computing device.

The natural language user input command and the natural language response may each be audible or in the form of visual text, as with other natural language inputs and responses discussed herein.

Figure 10:
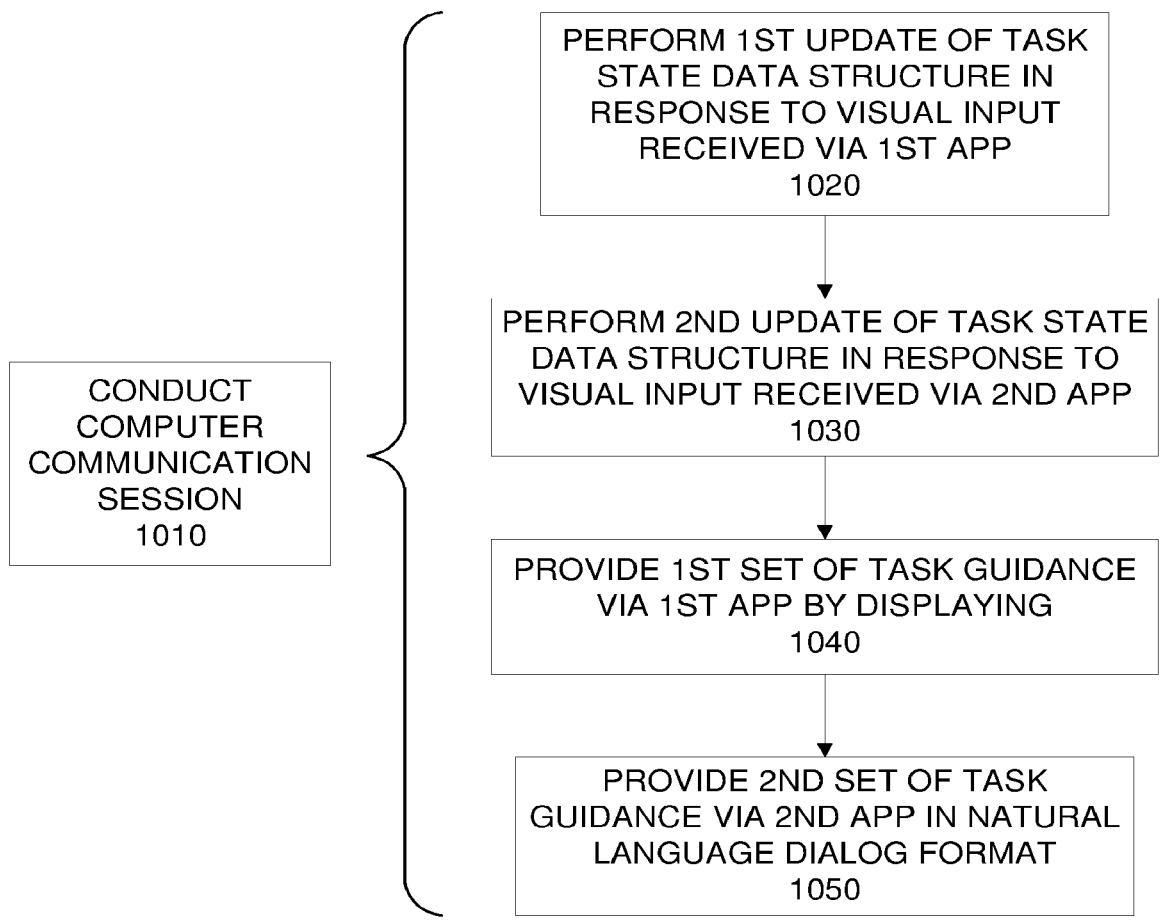
FIG. 10 is a flowchart of a technique for cross-application computerized task guidance.

C. FIG. 10 Technique

Referring now to FIG. 10, a cross-application computerized task guidance technique will be discussed. The technique can include conducting (1010) an interactive computer communication session with an authenticated user profile via a first computer application, a second computer application, a shared digital working task document, and a shared digital task state data structure. The working task document can include instructions for performing a task, with the task state data structure indicating a state of completion of the task. The conducting (1010) of the session can include performing a first update of the task state data structure in response to visual user input received from the user profile via the first computer application, with the visual user input directed at an element of the working task document. The conducting (1010) may also include performing (1030) a second update of the task state data structure in response to natural language input received from the user profile via the second computer application. The conducting (1010) may further include providing (1040) a first set of task guidance to the user profile via the first computer application in a visual format by displaying at least a portion of the working task document on a computer display, with the first set of task guidance being provided using the working task document and the task state data structure, and with the first set of task guidance representing the first update and the second update. The conducting (1010) may also include providing a second set of task guidance to the user profile via the second computer application in a natural language dialog format, with the second set of task guidance being provided using the working task document and the task state data structure.

The session of the FIG. 10 technique can include running the first computer application via a first computing device and running the second computer application via a second computing device that is separate from the first computing device. In other implementations, the first and second computer applications may be running via the same computing device. Note that the session of FIG. 10, as with the sessions discussed above, can exist in the computer system and can involve the participation of the two or more applications and/or devices as part of the session at the same time, or simultaneously.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
   at least one processor; and
   memory comprising instructions stored thereon that when executed by at least one processor cause at least one processor to perform acts comprising:
   accessing a base task document that is configured to be displayed on a computer display, with the base task document comprising textual task instructions for completing a task;
   generating a working task document from the base task document, with the working task document comprising the textual task instructions and natural language dialog information derived from the textual task instructions;
   selecting at least a portion of the working task document for display on a visual interface;
   selecting, for an audible interface, audible content that comprises a natural language script using the dialog information from at least a portion of the working task document;
   generating a computer-readable task state data structure that represents a state of interaction with the working task document, with the task state data structure being accessible and updatable via the audible interface and the visual interface;
   in response to receiving a natural language user input command via the audible interface as part of the natural language dialog, generating a natural language response that is particular to the task state data structure; and
   communicating the natural language response to the audible interface for output to the user.

2. The computer system of claim 1, wherein the acts further comprise, in response to receiving visual user input via the first computing device, performing an update to the task state data structure to represent the visual user input, with the visual user input being directed at an item on the working task document on the computer display, and with the visual user input indicating a state of progress in completing the task, wherein the natural language response reflects the update to the task state data structure.

3. The computer system of claim 2, wherein the visual user input and the update to the task state data structure both indicate completion of a step in the task, with the visual user input being directed to a representation of the step in the task on a display of the first computing device.

4. The computer system of claim 1, wherein generating the natural language dialog information comprises breaking down a step in the task instructions into multiple smaller steps.

5. The computer system of claim 1, wherein generating the natural language dialog information comprises formatting a step in the task instructions to be interactively marked as one of multiple available states, with the multiple available states comprising a completed state and a not completed state.

6. The computer system of claim 1, wherein generating the natural language dialog information comprises labeling steps in the task instructions, with the labeling comprising labeling each of the labeled steps with a label to distinguish that step from other steps in the task instructions.

7. The computer system of claim 1, wherein the task state data structure and the working task document are separate data structures.

8. The computer system of claim 1, wherein the acts further comprise:
   receiving an annotating user input comprising an annotation for the working task document;
   responding to the annotating user input by saving the annotation in connection with the working task document;
   after saving the annotation, receiving a subsequent request for a presentation of the working task document; and
   providing the annotation and the working task document in response to the subsequent request.

9. The computer system of claim 1, wherein generating the natural language response comprises using the working task document as a context for running a computerized search to retrieve results that are outside of the working task document, outside of the base task document, and outside of the task state data structure.

10. The computer system of claim 1, wherein generating the natural language response comprises accessing the task state data structure, wherein the natural language response comprises a statement about a state of performance of the task as represented in the task state data structure.

11. The computer system of claim 1, wherein generating the natural language response comprises accessing the working task document, wherein the natural language response comprises a statement about data in the working task document.

12. A computer-implemented method, comprising:
   providing a first computing device and a second computing device access to a working task document including a textual task description describing task steps to be completed in performing a task;
   generating a computer-readable task state data structure that represents a state of interaction with the working task document, with the task state data structure being accessible via the first computing device and the second computing device;
   in response to receiving information describing a visual user input received via the first computing device, performing a first update to the task state data structure to represent the visual user input, with the visual user input indicating a state of progress in completing the task; and
   in response to receiving information describing a natural language user input command received via the second computing device, performing a second update to the task state data structure to represent the natural language user input, with the natural language user input indicating a state of progress in completing the task; and
   providing the second computing device access to the task state data structure to facilitate generation of a natural language response.

13. The method of claim 12, wherein the method further comprises:
   accessing a base task document that is configured to be displayed, with the base task document comprising textual task instructions for completing the task; and
   generating the working task document from the base task document, with the working task document comprising the textual task instructions in an overlay for use in conducting a natural language dialog comprising natural language user input and responsive natural language scripts from a digital assistant.

14. The method of claim 12, further comprising generating natural language dialog information by labeling steps in the task instructions, with the labeling comprising labeling each of the labeled steps with a label to distinguish that step from other steps in the task instructions.

15. The method of claim 12, wherein the second update comprises inserting in the task state data structure an indicator that a task step in the working task document is completed.

16. The method of claim 12, wherein each of the first computing device and the second computing device are configured to present textual data from the working task document as user output without requiring involvement of the other computing device.

17. The method of claim 12, wherein each of the first computing device and the second computing device are configured to retrieve data from the task state data structure and to update the task state data structure without requiring involvement of the other computing device.

18. The method of claim 12, wherein the natural language user input is audible.

19. A computer implemented method comprising:
conducting an interactive computer communication session via a visual interface component, an audible interface component, a shared working task document, and a shared task state data structure, with the working task document comprising instructions for performing a task, with the task state data structure indicating a state of completion of the task, and with the conducting of the session comprising:
performing a first update of the task state data structure in response to visual user input received from the visual interface component, with the visual user input directed at an element of the working task document;
performing a second update of the task state data structure in response to natural language input received from the audible interface component;
providing a first set of task guidance to the visual interface component in a visual format, with the first set of task guidance being provided using the working task document and the task state data structure, and with the first set of task guidance representing the first update and the second update; and
providing a second set of task guidance to the audible interface component in a natural language dialog format, with the second set of task guidance being provided using the working task document and the task state data structure.

20. The method of claim 19, wherein the audible interface component is running on a first computing device and the visual interface component is running on a second computing device.

* * * * *